US009152885B2

(12) United States Patent
Ogishi et al.

(10) Patent No.: US 9,152,885 B2
(45) Date of Patent: Oct. 6, 2015

(54) IMAGE PROCESSING APPARATUS THAT GROUPS OBJECTS WITHIN IMAGE (71) Applicant: KYOCERA Document Solutions Inc., Osaka (JP)

(72) Inventors: Ryosuke Ogishi, Osaka (JP); Yosuke Kashimoto, Osaka (JP); Masaaki Aiba, Osaka (JP); Takashi Murakami, Osaka (JP)

(73) Assignee: KYOCERA Document Solutions Inc. (JP)

( * ) Notice: Subject to any disclaimer, the term of this patent is extended or adjusted under 35 U.S.C. 154(b) by 111 days.

(21) Appl. No.: 13/860,337

(22) Filed: Apr. 10, 2013

(65) Prior Publication Data

US 2013/0272610 A1    Oct. 17, 2013

(30) Foreign Application Priority Data

Apr. 12, 2012   (JP) ................................. 2012-091429

(51) Int. Cl.
*G06K 9/34* (2006.01)
*G06K 9/62* (2006.01)
*G06K 9/00* (2006.01)

(52) U.S. Cl.
CPC .......... *G06K 9/6267* (2013.01); *G06K 9/00456* (2013.01); *G06K 2009/00489* (2013.01)

(58) Field of Classification Search
None
See application file for complete search history.

(56) References Cited

U.S. PATENT DOCUMENTS

| 6,366,910 | B1 * | 4/2002 | Rajaraman et al. ................... 1/1 |
| 7,134,077 | B2 * | 11/2006 | Sellen et al. .................. 715/268 |
| 2007/0189615 | A1 * | 8/2007 | Liu et al. ....................... 382/232 |
| 2010/0183223 | A1 * | 7/2010 | Matsuoka ..................... 382/166 |

FOREIGN PATENT DOCUMENTS

| JP | 03-160568 | 7/1991 |
| JP | 04-191882 A | 7/1992 |
| JP | 06-180770 | 6/1994 |
| JP | 08-044884 A | 2/1996 |
| JP | 08-202711 A | 8/1996 |
| JP | 2002-112022 A | 4/2002 |
| JP | 2004-341631 | 12/2004 |
| JP | 2006-005766 A | 1/2006 |
| JP | 2006-270439 | 10/2006 |

* cited by examiner

*Primary Examiner* — Bhavesh Mehta
*Assistant Examiner* — Feng Niu
(74) *Attorney, Agent, or Firm* — McDonnell Boehnen Hulbert & Berghoff LLP (57) ABSTRACT

Provided is an image processing apparatus including: a grouping preference unit configured to register user preference information on a storage device based on a user operation, the user preference information indicating how objects within an image are to be classified into groups; an image analysis unit configured to detect the objects within the image; and a grouping unit configured to read the user preference information from the storage device and classify the objects detected within the image into the groups indicated in the read user preference information.

17 Claims, 7 Drawing Sheets

IMAGE PROCESSING APPARATUS THAT GROUPS OBJECTS WITHIN IMAGE

REFERENCE TO RELATED APPLICATIONS

This application is based upon and claims the benefit of priority from the corresponding Japanese Patent Application No. 2012-091429, filed in the Japan Patent Office on Apr. 12, 2012, the entire contents of which are incorporated herein by reference.

BACKGROUND

1. Technical Field

The present disclosure relates to an image processing apparatus that groups objects within an image.

2. Description of the Related Art

A typical image processing apparatus uses optical character recognition (OCR) technology to extract characters within an image. Further, the image processing apparatus extracts characters, line segments, and images, and performs compression thereof separately.

A typical image editing system allows a user to manually select a plurality of objects within the displayed image by using a mouse or the like. The image editing system then classifies the selected objects.

When the image editing system is used to classify the objects extracted by the image processing apparatus, it is necessary for the user to select the objects one by one from the displayed image. Therefore, the user is required to classify the objects one by one with the image being displayed—an task which may prove complicated.

SUMMARY

An image processing apparatus according to an embodiment of the present disclosure includes a grouping preference unit, an image analysis unit, and a grouping unit. The grouping preference unit is configured to register user preference information that indicates how objects within an image should be classified into groups; the preference information is registered on a storage device based on a user operation. The image analysis unit is configured to detect the objects within the image. The grouping unit is configured to read the user preference information from the storage device and classify the objects detected within the image into the groups indicated in the read user preference information.

A computer-readable non-transitory recording medium according to an embodiment of the present disclosure has stored thereon an image processing program executed by a computer of an image processing apparatus. The image processing program includes first to third program codes. The first program code causes the computer to register user preference on a storage device based on a user operation. The user preference information indicates how objects within an image should be classified into groups. The second program code causes the computer to detect the objects within the image. The third program code causes the computer to read the user preference information from the storage device and classify the objects detected within the image into the groups indicated in the read user preference information.

An image processing method according to an embodiment of the present disclosure includes: (i) registering, by a grouping preference unit, user preference information on a storage device based on a user operation, wherein the user preference information indicates how objects within an image should be classified into groups; (ii) detecting, by an image analysis unit, the objects within the image; and (iii) reading, by a grouping unit, the user preference information from the storage device and classifying the objects detected within the image into the groups indicated in the read user preference information.

Additional features and advantages are described herein, and will be apparent from the following Detailed Description and the figures.

DETAILED DESCRIPTION

Described below is an embodiment of the present disclosure, with reference to the accompanying drawings.

Figure 1:
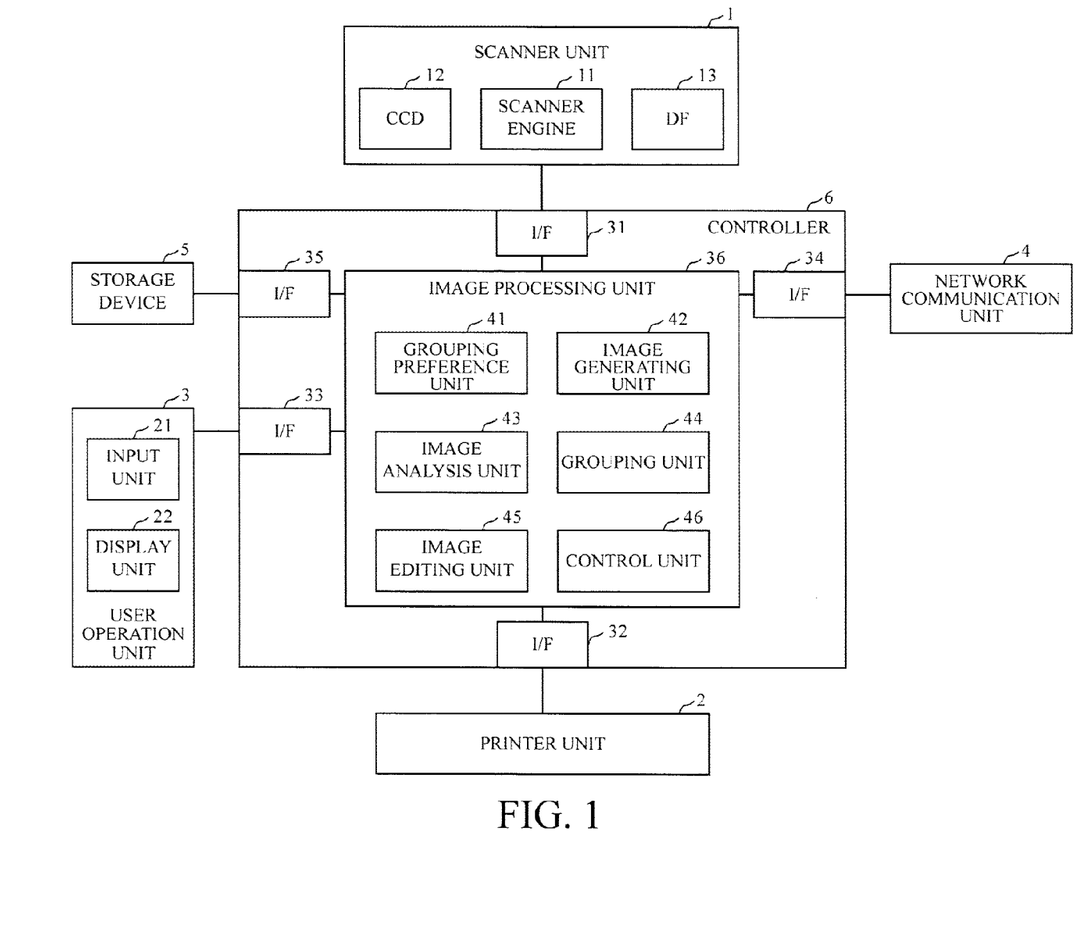
FIG. 1 illustrates a configuration of an image processing apparatus according to an embodiment of the present disclosure.

FIG. 1 illustrates a configuration of an image processing apparatus according to the embodiment of the present disclosure. The image processing apparatus illustrated in FIG. 1 takes the form of a multifunction peripheral, and includes scanner unit 1, printer unit 2, user operation unit 3, network communication unit 4, storage device 5, and controller 6.

Scanner unit 1 is an internal device that optically reads an original image and outputs image data on the original image. Scanner unit 1 includes scanner engine 11, charge coupled device (CCD) 12, and document feeder 13. In response to a request (issued from controller 6), scanner engine 11 controls CCD 12, document feeder (DF) 13, and other devices (not shown) to read the original image and generate the image data (raster data) on the original image.

Printer unit 2 is an internal device that prints an image based on image data obtained from controller 6 in response to a request issued from controller 6.

User operation unit 3 is, for example, an operation panel mounted to a casing of the image processing apparatus, and includes input unit 21 and display unit 22. Input unit 21 is a device that detects a user operation and outputs an electric signal corresponding to the user operation. Input unit 21 may be, for example, a hardware key or a touch panel. Display unit 22 is a device that displays various kinds of information to a user. Display unit 22 may be, for example, a liquid crystal display or a light emitting diode (LED) indicator. User operation unit 3 displays a screen corresponding to a request issued from controller 6 on display unit 22, and supplies controller 6 with information on the user operation detected by input unit 21.

Network communication unit 4 is a device that is connected to a network and performs data communications to/from a host device and the like.

Storage device 5 is a device that stores registration information on the user, user preference information (described below), the image data on the original image generated by scanner unit 1, and the like. Storage device 5 may be, for example, a nonvolatile storage device such as a hard disk drive.

Controller 6 includes interface (I/F) 31 that performs data communications to/from scanner unit 1, interface (I/F) 32 that performs data communications to/from printer unit 2, interface (I/F) 33 that performs data communications to/from user operation unit 3, interface (I/F) 34 that performs data communications to/from network communication unit 4, interface (I/F) 35 that performs data communications to/from storage device 5, and image processing unit 36. Controller 6 includes at least one of an application specific integrated circuit (ASIC) and a computer that includes a central processing unit (CPU), a read only memory (ROM), and a random access memory (RAM). Controller 6 executes an image processing program to operate as image processing unit 36. The image processing program is stored on a recording medium such as a ROM or storage device 5.

Image processing unit 36 includes grouping preference unit 41, image generating unit 42, image analysis unit 43, grouping unit 44, image editing unit 45, and control unit 46.

Grouping preference unit 41 identifies the user preference information based on the user operation detected by input unit 21, and registers the user preference information on storage device 5. The user preference information indicates how objects within an image (for example, an image read by scanner unit 1) are to be classified into groups.

The user preference information also designates at least one of a text area, an image area, and a ruled line area as a classification of objects. With regard to the text area, the user preference information may also include setting information as to whether to (i) classify objects depending on whether characters are handwritten, (ii) classify objects depending on a character type, (iii) execute classification depending on a character effect, and/or (iv) execute such classification as to extract a word to which a designated character is added. And again with regard to the image area, the user preference information may additionally include at least setting information as to whether to classify objects depending on whether the image is a facial image and/or whether the image has a specific shape.

With regard to the ruled line area, the user preference information may also include setting information as to whether to classify objects depending on a direction of a ruled line, a line type of the ruled line, and/or a thickness of the ruled line.

Image generating unit 42 controls scanner unit 1 to read the original image and acquire the image data on the original image. Image analysis unit 43 detects objects within the image based on the image data acquired by image generating unit 42. The objects represent individual images of the text area, the image area, the ruled line area, and the like within the original image. Image analysis unit 43 uses a known technology to detect the text area, the image area, and the ruled line area within the image.

To detect the text area, a general optical character recognition (OCR) technology (for example, technology disclosed in Japanese Patent Application Laid-open No. 2004-341631) may be used. To detect the image area, a technology such as "Study of method of recognizing complex objects from aerial photograph" (Sudo, Takashi et al., Jun. 29, 2000, Japan Society of Photogrammetry and Remote Sensing, 2000 annual collection of academic lecture presentation papers) or "Study of method of semiautomatically extracting object concepts from aerial image" (Kubo, Takahiro et al., Mar. 8, 2002, Computer Vision and Image Media 132-2, Information Processing Society of Japan) may be used.

Grouping unit 44 reads the user preference information from storage device 5, and classifies the objects detected within the image by image analysis unit 43 into the groups indicated in the user preference information. The grouping unit 44 also generates object data on each object and classification data regarding each classification designated in the user preference information, and retains those pieces of data in the RAM within controller 6 or storage device 5. The object data includes an object ID unique to each object, positional information for identifying an area of the object (including shape information on the area), and attribute information. The attribute information indicates the group (such as text area) to which the object belongs. The classification data includes a classification ID unique to each the group and a list of the object ID of at least one object that belongs to each group. The object data and the classification data are generated for each original image and retained in association with, for example, the image data on the original image.

In this embodiment, by thus generating the classification data, grouping unit 44 classifies, for each group of objects designated in the user preference information, the objects that belong to the group.

Grouping preference unit 41 may register the user preference information in association with a user who has logged in, and grouping unit 44 may read and use the user preference information associated with the user who has logged in. In that case, the user preference information is registered in association with a user ID. Further, in that case, user registration information associated with the user (user ID or user ID and passcode) is registered on storage device 5 in advance. Then, controller 6 refers to the user registration information in order to (i) identify the user based on the user ID (or user ID and passcode) presented by the user when the user starts to use the image processing apparatus, and to (ii) determine whether or not to permit login.

Image editing unit 45 performs an image edit for the object within the image. Specifically, input unit 21 detects a first user operation for selecting the group designated in the user preference information from among the objects within the image. Input unit 21 also detects a second user operation for selecting an edit method for the objects belonging to the selected group. If the first user operation and the second user operation are detected by an input unit, image editing unit 45 uses the edit method selected by the second user operation to edit all the objects belonging to the group selected by the first user operation within the image. In that case, the images before and after the edit are displayed on display unit 22. Control unit 46 may control printer unit 2 to print the image after the edit performed by image editing unit 45.

Next, a description is made of an operation of the above-mentioned image processing apparatus.

(1) Registration of User Preference Information

Figure 2:
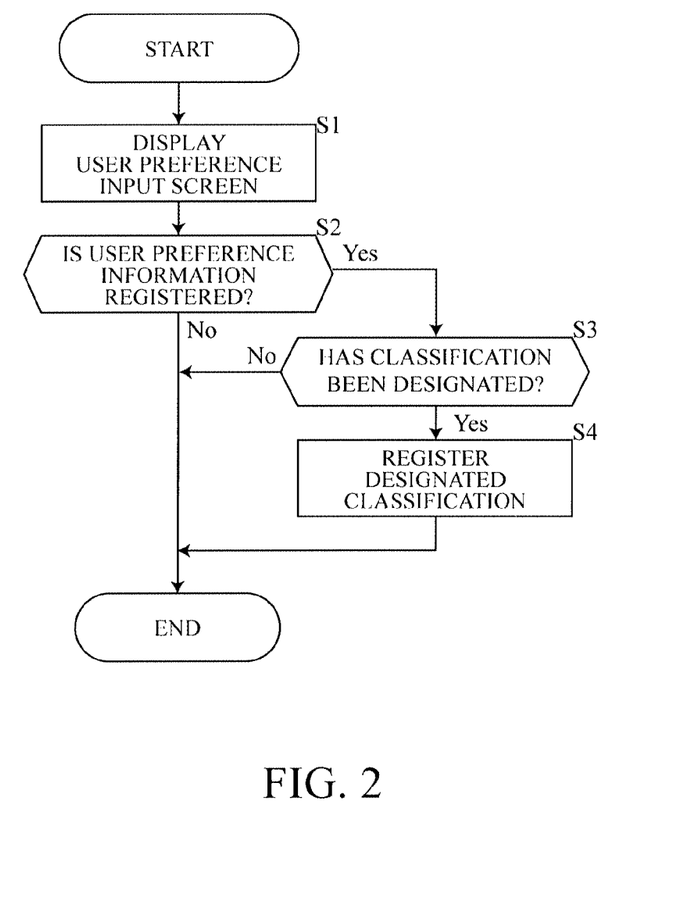
FIG. 2 illustrates a process for registering user preference information performed by the image processing apparatus illustrated in FIG. 1.

FIG. 2 illustrates a registration process performed by the image processing apparatus illustrated in FIG. 1 with respect to the user preference information.

When the user performs a specific operation on the input unit, the input unit detects the user operation, and the grouping preference unit displays a user preference input screen on the display unit (Step S1).

Figure 3:
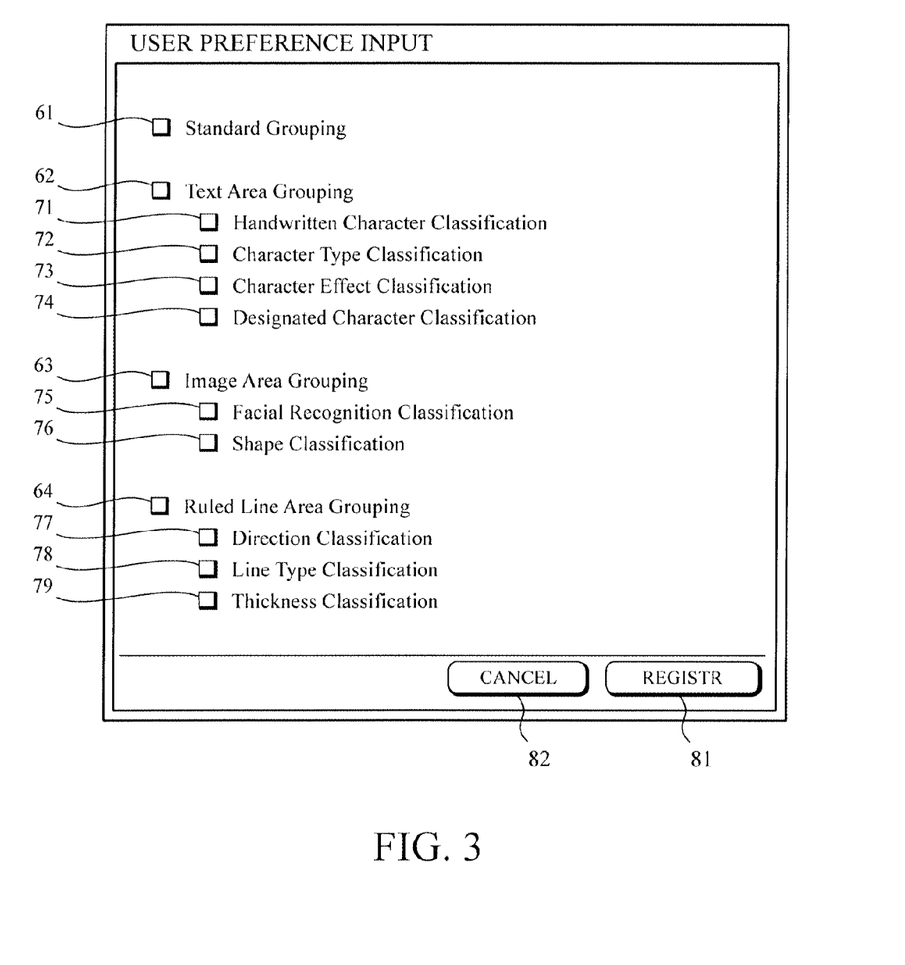
FIG. 3 illustrates an example of a user preference input screen displayed on the image processing apparatus illustrated in FIG. 1 at a time of registration of the user preference information.

FIG. 3 illustrates an example of the user preference input screen displayed on the image processing apparatus illustrated in FIG. 1 at a time of registration of the user preference information. On the user preference input screen illustrated in FIG. 3, it is possible to select, as a broader classification, a "text area grouping", an "image area grouping", and/or a "ruled line area grouping".

If check box 61 for "standard grouping" is checked, a "text area grouping", an "image area grouping", and a "ruled line area grouping" are all designated.

If check box 62 for the "text area grouping" is checked, the "text area grouping" is designated. By designating the "text area grouping", objects within the text area will be classified into groups. The classification ID for the text area is pre-set, and in the classification data, the classification ID for the text area is associated with the object ID of the text area.

If check box 63 for the "image area grouping" is checked, the "image area grouping" is designated. By designating the "image area grouping," objects within the image area will be classified into groups. The classification ID for the image area is pre-set, and in the classification data, the classification ID for the image area is associated with the object ID of the image area.

If check box 64 for the "ruled line area grouping" is checked, the "ruled line area grouping" is designated. By designating the "rules line area grouping," objects within the ruled line area will be classified into groups. The classification ID for the ruled line area is pre-set, and in the classification data, the classification ID for the ruled line area is associated with the object ID of the ruled line area.

Further, the following classifications can be set as a sub-classification of the "text area grouping."

That is, if check box 71 for "handwritten character classification" is checked, a value indicating "execute classification" is set for the text area, specifying whether or not to perform the classification depending on whether or not the characters are handwritten. If not checked, a value indicating "do not execute classification" is set.

The classification ID for the handwritten characters and the classification ID for the other characters (in other words, printing-type characters) are pre-set. When the "handwritten character classification" is executed, in the classification data, the classification ID for the handwritten characters is associated with the object ID of the text area extracted as handwritten characters. The classification ID for the other characters (in other words, printing-type characters) is associated with the object ID of the text area of the other characters (in other words, printing-type characters).

If check box 72 for "character type classification" is checked, the value indicating "execute classification" is set for the text area, specifying whether to perform the classification depending on the character type (such as character, font type, or font size). If not checked, the value indicating "do not execute classification" is set. As a sub-classification of the "character type classification," designation of at least one character type may be allowed. Examples of the font type may include an italic type and a boldface type.

At least one classification ID for the at least one character type is pre-set. When the "character type classification" is executed, in the classification data, the classification ID for each character type is associated with the object ID of the text area extracted as the character type.

If check box 73 for "character effect classification" is checked, the value indicating "execute classification" is set for the text area, specifying whether to perform the classification depending on the character effect (effect such as marker or underline). If not checked, the value indicating "do not execute classification" is set. As a sub-classification of the "character effect classification", the designation of at least one character type may be allowed.

At least one classification ID for at least one character effect is pre-set. When the "character effect classification" is executed, in the classification data, the classification ID for each character effect is associated with the object ID of the text area extracted depending on the character effect.

If check box 74 for "designated character classification" is checked, the value indicating "execute classification" is set for the text area, specifying whether or not to execute the designated character classification for classifying the word including the designated character (or word subsequent to the designated character). If not checked, the value indicating "do not execute classification" is set. The designated character may be set as, for example, a quotation mark such as """" or """".

The classification ID for the designated character is pre-set. When the "designated character classification" is executed, in the classification data, the classification ID for the designated character is associated with the object ID of the text area extracted as the word regarding the designated character.

Further, as a sub-classification of the "image area grouping", the following classifications can be set.

That is, if check box 75 for "facial recognition classification" is checked, the value indicating "execute classification" is set for the image area, specifying whether or not to execute the classification depending on whether or not the image is a facial image. If not checked, the value indicating "do not execute classification" is set.

The classification ID for the facial image is set pre-set, and when the "facial recognition classification" is executed, in the classification data, the classification ID for the facial image is associated with the object ID of the image area extracted as the facial image.

If check box 76 for "shape classification" is checked, the value indicating "execute classification" is set for the image area, specifying whether or not to execute the classification depending on whether or not the image has a specific shape. If not checked, the value indicating "do not execute classification" is set. As a sub-classification of the "shape classification", the designation of at least one shape may be allowed.

The classification ID for each shape is pre-set. When the "shape classification" is executed, in the classification data, the classification ID for each shape is associated with the object ID of the image area extracted depending on the shape.

Further, the following classifications can be set as a sub-classification of the "ruled line area grouping."

That is, if check box 77 for "direction classification" is checked, the value indicating "execute classification" is set for the ruled line area, specifying whether or not to execute the classification depending on whether the ruled line is a vertical rule or a horizontal rule. If not checked, the value indicating "do not execute classification" is set.

The classification ID for each of the vertical rule and the horizontal rule is pre-set. When the "direction classification" is executed, in the classification data, the classification ID for the vertical rule and the horizontal rule is associated with the object IDs of the ruled line areas extracted as the vertical rule and the horizontal rule.

If check box 78 for "line type classification" is checked, the value indicating "execute classification" is set, specifying whether or not to execute the classification depending on a line type (such as solid line, broken line, or chain line). If not checked, the value indicating "do not execute classification" is set. As a sub-classification of the "line type classification", the designation of at least one line type may be allowed.

The classification ID for each line type is pre-set. When the "line type classification" is executed, in the classification data, the classification ID for each line type is associated with the object ID of the ruled line area extracted depending on the line type.

If check box 79 for "thickness classification" is checked, the value indicating "execute classification" is set for the ruled line area, specifying whether or not to execute the classification depending on a thickness (such as thick or thin) of a line. If not checked, the value indicating "do not execute classification" is set. As a sub-classification of the "thickness classification", the designation of at least one thickness may be allowed.

The classification ID for each thickness is set pre-set. When the "thickness classification" is executed, in the classification data, the classification ID for each thickness is associated with the object ID of the ruled line area extracted depending on the thickness.

As illustrated in FIG. 2, the grouping unit determines whether or not to register the user preference information in response to the user operation (Step S2). For example, on an input screen illustrated in FIG. 3, if registration button 81 is operated, the grouping unit determines that the user preference information is to be registered. Alternatively, for example, if cancel button 82 is operated, the grouping unit determines that the user preference information is not to be registered. If it is determined that the user preference information is not to be registered, the grouping unit ends the registration process without registering the user preference information.

As illustrated in FIG. 2, if it is determined that the user preference information is to be registered, the grouping unit determines whether or not at least one classification has been designated by the user on the user preference input screen (Step S3). For example, on the input screen illustrated in FIG. 3, the grouping unit determines whether or not at least one of check boxes 61 to 64 and 71 to 79 has been checked.

As illustrated in FIG. 2, if the classification is not designated on the user preference input screen, the grouping unit ends the registration process without registering the user preference information.

If the classification is designated on the user preference input screen, the grouping unit registers the designated classification as the user preference information (Step S4).

The user preference information includes, for example, data indicating on/off of all the classifications. For example, on the user preference input screen illustrated in FIG. 3, the classification ID and the value (for example, 1 or 0) of the check box (any one of check boxes 61 to 64 and 71 to 79 illustrated in FIG. 3) for the classification corresponding to the classification ID are registered in association with each other as the user preference information.

In this manner, the user preference information indicating the method of classifying objects within an image are designated and registered in advance by the user.

(2) Grouping and Edit of Objects within Image

Figure 4:
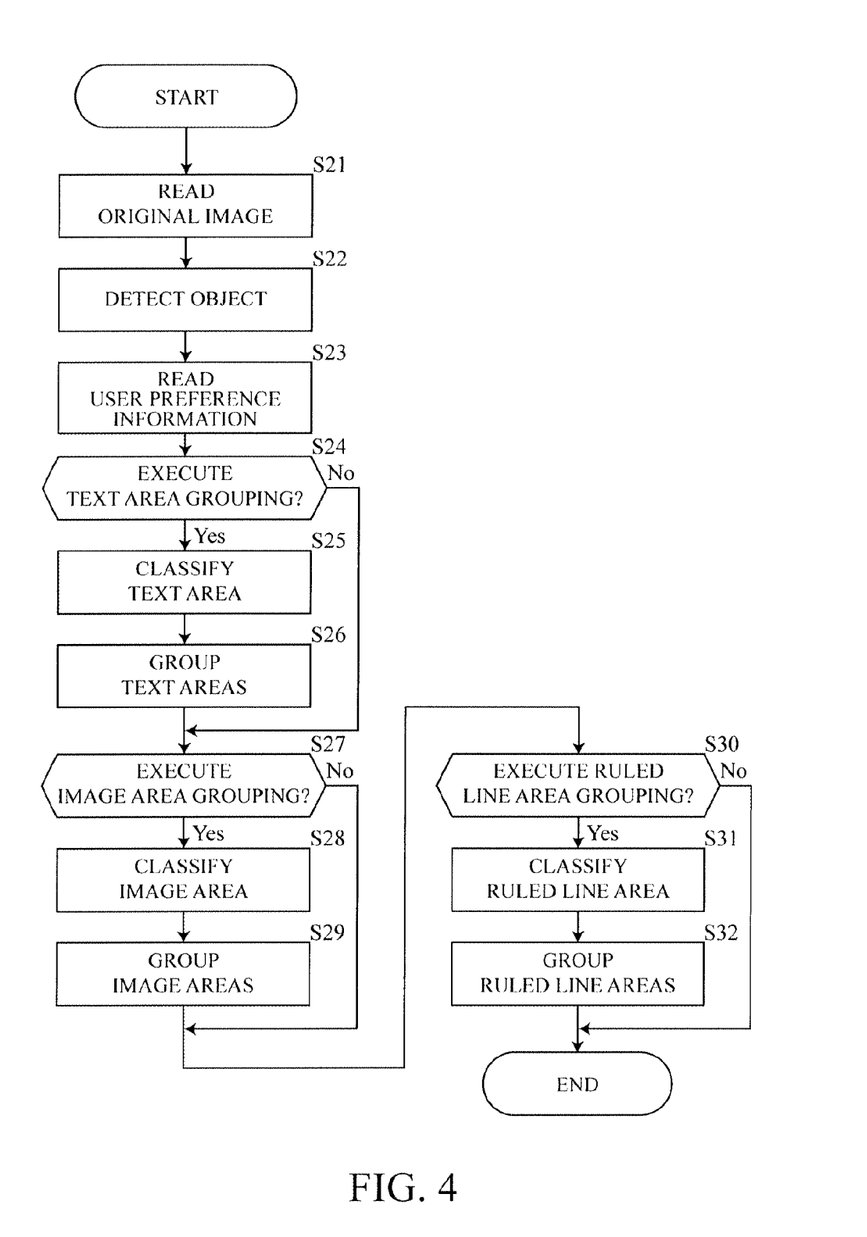
FIG. 4 illustrates a process for classifying objects within an image performed by the image processing apparatus illustrated in FIG. 1.

FIG. 4 illustrates a process performed by the image processing apparatus illustrated in FIG. 1 for classifying objects within an image.

In response to an operation performed on the input unit by the user, the image generating unit (i) causes the scanner unit to read the original image, and (ii) acquires the image data on the original image (Step S21).

Subsequently, the image analysis unit analyzes the image data to detect the objects (in this case, text area, image area, and ruled line area) within the image based on the image data (Step S22). At this time, the image analysis unit may be configured to detect only areas for which the grouping is designated in the user preference information (i.e., from among the text area, the image area, and/or the ruled line area).

Then, the grouping unit reads the user preference information (Step S23) to determine whether or not the execution of the "text area grouping" is designated in the user preference information (Step S24).

If the execution of the "text area grouping" is designated in the user preference information, the grouping unit classifies the text area detected by the image analysis unit by the sub-classification designated in the user preference information (Step S25). Then the grouping unit associates the object ID of each text area with the classification ID for the text area. In addition, the grouping unit associates the object ID of the text area belonging to each sub-classification with the classification ID of each sub-classification to generate the classification data, and groups the text areas (Step S26).

If the execution of the "text area grouping" is not designated in the user preference information, execution of Steps S25 and S26 is skipped.

Further, the grouping unit determines whether or not the execution of the "image area grouping" is designated in the user preference information (Step S27). If the execution of the "image area grouping" is designated in the user preference information, the grouping unit classifies the image area detected by image analysis unit 43 by the sub-classification designated in the user preference information (Step S28). Then the grouping unit associates the object ID of each image area with the classification ID for the image area. In addition, the grouping unit associates the object ID of the image area that belongs to each sub-classification with the classification ID of each sub-classification to generate the classification data, and groups the image areas (Step S29). If the execution of the "image area grouping" is not designated in the user preference information, the processing of Steps S28 and S29 is skipped.

Further, the grouping unit determines whether or not the execution of the "ruled line area grouping" is designated in the user preference information (Step S30). If the execution of the "ruled line area grouping" is designated in the user preference information, the grouping unit classifies the ruled line area detected by the image analysis unit by the sub-classification designated in the user preference information (Step S31). Then the grouping unit associates the object ID of each ruled line area with the classification ID for the ruled line area. In addition, the grouping unit associates the object ID of the ruled line area belonging to each sub-classification with the classification ID of each sub-classification to generate the classification data, and groups the image areas (Step S32). If the execution of the "ruled line area grouping" is not designated in the user preference information, the processing of Steps S31 and S32 is skipped.

In this manner, the classification of the objects within the original image is executed.

Figure 5:
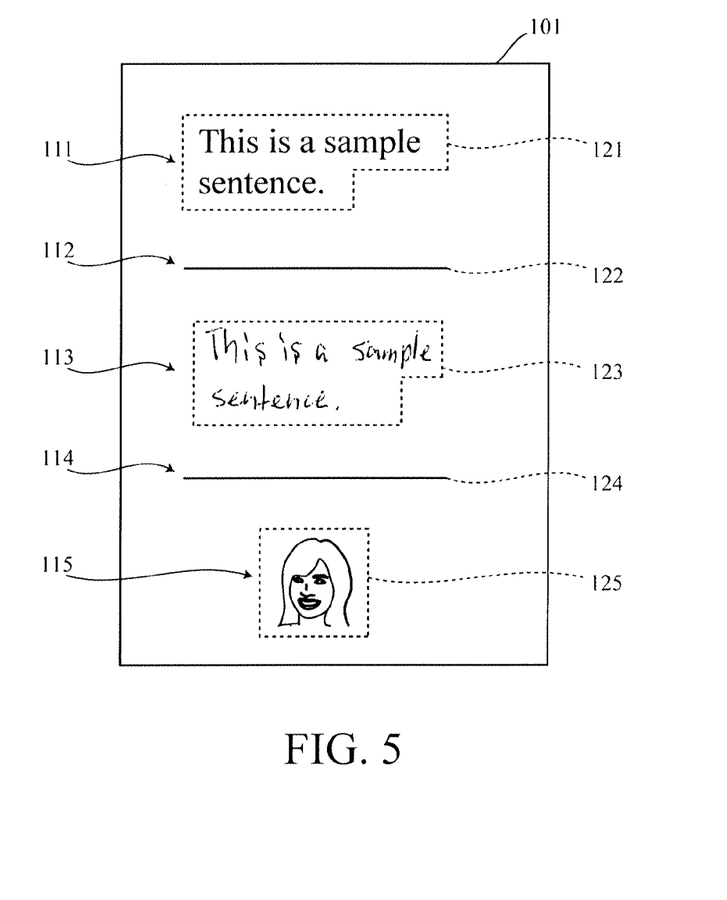
FIG. 5 illustrates an example of a grouping of the objects within the image performed by the image processing apparatus illustrated in FIG. 1.

FIG. 5 illustrates an example of the classification of the objects within the original image performed by the image processing apparatus illustrated in FIG. 1. Assuming that printing-type character 111, horizontal rule 112, handwritten characters 113, horizontal rule 114, and facial image 115 exist within image 101, when the "standard grouping" is designated, those objects are detected as text area 121, ruled line area 122, text area 123, ruled line area 124, and image area 125, respectively.

If the execution of the "text area grouping" is designated in the user preference information, in the classification data on image 101 illustrated in FIG. 5, the classification ID for the text area is associated with the object ID of text area 121 and the object ID of text area 123.

Further, if the execution of the "text area grouping" sub-classification "handwritten character classification" is designated in the user preference information, in the classification data on image 101 illustrated in FIG. 5, the classification ID for the handwritten characters is associated with the object ID of text area 123. Then the classification ID for the other characters is associated with the object ID of text area 121. On the other hand, if the execution of the "handwritten character classification" being the sub-classification of the "text area grouping" is not designated in the user preference information, data on the classification ID for the handwritten characters and the classification ID for the other characters is not included in the classification data on image 101 illustrated in FIG. 5.

Described next is the image edit performed for each group of objects within the image (in other words, for each classification).

Figure 6:
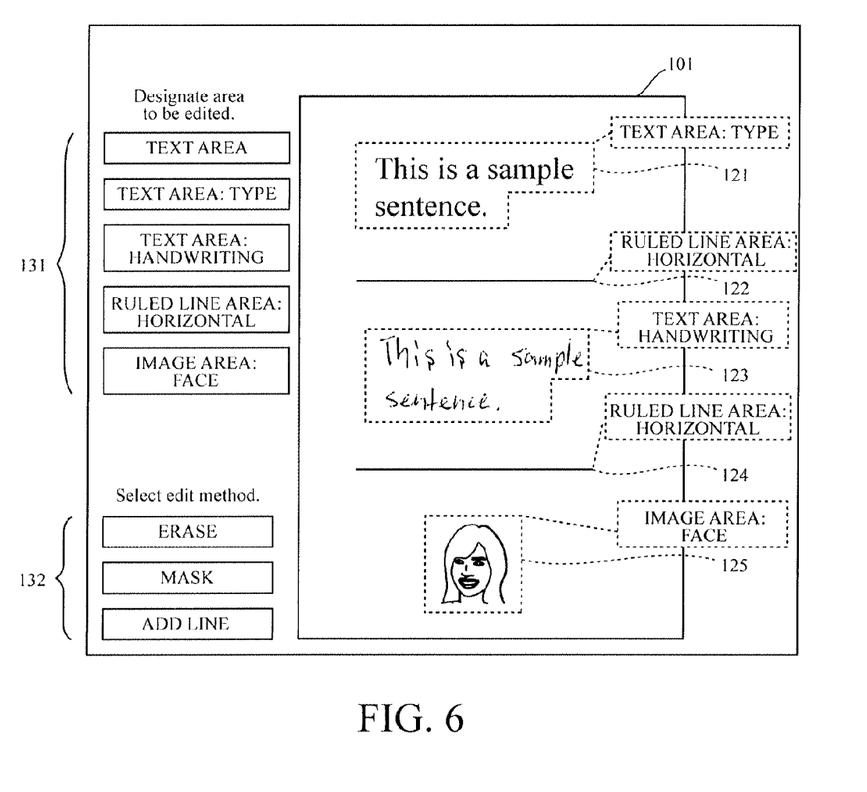
FIG. 6 illustrates an example of an image edit screen for the objects displayed by the image processing apparatus illustrated in FIG. 1.

In response to the operation performed by the user, an image editing unit causes an image edit screen to be displayed on the display unit.

FIG. 6 illustrates an example of the image edit screen for the objects displayed by the image processing apparatus illustrated in FIG. 1. On the image edit screen, image 101 and respective areas 121 to 125 that are to be edited are displayed. Also displayed are the classification list 131 for designating the classification of what is to be edited and the edit method list 132 for designating the edit method (i.e., how the objects within the image are to be classified into groups). Classification list 131 is a list of the classifications included in image 101 to be edited.

If the first user operation for selecting any one of the classifications within classification list 131 and the second user operation for selecting any one of the edit methods within edit method list 132 are detected by the input unit, the image editing unit refers to the classification data. The image editing unit identifies the object ID associated with the classification ID of the selected classification within the classification data, identifies the area of the object from the positional information associated with the identified object ID in the object data, and edits the image within the identified area by the selected edit method.

Figure 7:
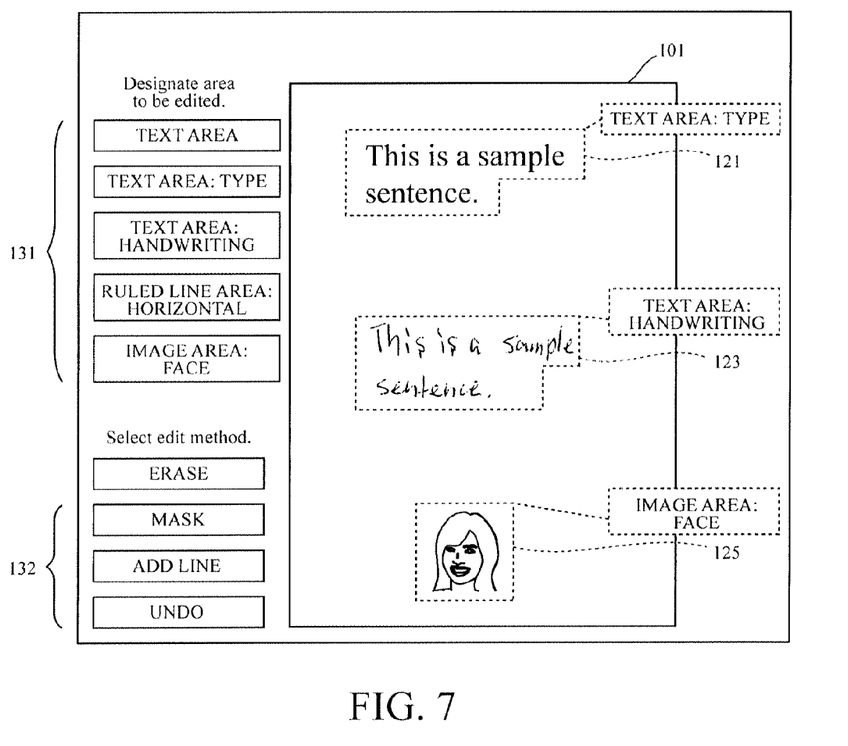
FIG. 7 illustrates an example of the image edit screen displayed after image edits for the objects are executed on the image edit screen illustrated in FIG. 6.

FIG. 7 illustrates an example of the image edit screen displayed after image edits for the objects are executed on the image edit screen illustrated in FIG. 6. For example, on the image edit screen illustrated in FIG. 6, if "ruled line area: horizontal" is selected by the first user operation and if "erase" is selected by the second user operation, the image editing unit identifies ruled line areas 122 and 124 as being the "ruled line area: horizontal" from the classification data and the object data. As illustrated in FIG. 7, the image editing unit erases ruled line areas 122 and 124 by substituting colors of identified ruled line areas 122 and 124 by the same color as a background color, and causes image 101, from which ruled line areas 122 and 124 have been erased, to be displayed.

Then, for example, a control unit causes the printer unit to print the image after the edit performed by the image editing unit. Alternatively, the image data on the image after the edit may be saved to the storage device.

As described above, according to the above-mentioned embodiment, based on the user operation, the grouping preference unit registers the user preference information on a storage device, the user preference information indicating how objects within an image are to be classified into groups. Then, the image analysis unit detects the objects within the image, and the grouping unit reads the user preference information from the storage device, and groups the objects detected within the image into the groups indicated in the read user preference information.

With this configuration, by registering the user preference information (in other words, by a simple task performed by the user), the detailed classification desired by the user is performed for the objects within the image, and the objects are classified into groups.

The present disclosure is not limited to the above-mentioned embodiment, and various changes and modifications can be made within the scope that does not depart from the gist of the present disclosure.

In the above-mentioned embodiment, a search function may be added to an image processing unit. The search function refers to the classification data and the object data to search for the objects belonging to the classification designated by the user, and then displays the retrieved objects.

The present disclosure can be applied to an image forming apparatus such as, for example, a multifunction peripheral.

It should be understood that various changes and modifications to the presently embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:
1. An image processing apparatus comprising:
a controller comprising at least one of an application specific integrated circuit (ASIC) or a computer, wherein the controller further comprises:
a grouping preference unit that registers user preference information on a storage device based on a user operation, wherein the user preference information indicates how objects within an image are to be classified into groups;
an image analysis unit that detects the objects within the image;
a grouping unit that reads the user preference information from the storage device and classifies the objects detected within the image into the groups indicated in the read user preference information; and
an image editing unit that edits, if (i) a first user operation for selecting a group designated in the user preference information, and (ii) a second user operation for selecting an edit method for the objects belonging to the selected group, are detected by the input unit, all the objects belonging to the selected group by the edit method selected by the second user operation; and
an operation panel mounted to a casing of the image processing apparatus, the operation panel comprising:
an input unit that detects the user operation; and
a display unit that displays the image at least one of before and after the edit performed by the image editing unit, wherein:
the user preference information includes a broader classification and a sub-classification belonging to the broader classification;

a broader classification ID identifies each broader classification;

a plurality of the sub-classification IDs identifies a plurality of types, respectively, belonging to the sub-classification;

the display unit displays, on a user preference input screen, selectable options that include a first option for selecting all broader classifications, a second option corresponding to each broader classification, and a third option corresponding to each sub-classification;

the grouping preference unit registers the user preference information including all of the broader classifications if the first option is selected, registers the user preference information including the broader classification corresponding to the selected second option if the second option is selected, and registers the user preference information including a plurality of the sub-classification corresponding to the third option if the third option is selected;

the grouping unit associates the broader classification ID with the object for the broader classification and associates each sub-classification ID with the object for each of the types depending on the sub-classification;

the display unit displays a classification list for designating one group of the broader classification and the sub-classification of what is to be edited and an edit method list for designating the edit method; and the image editing unit identifies all the objects associated with the classification ID, corresponding to either the broader classification ID or the sub-classification ID, of the selected group within the classification list by the first user operation and edits all the identified objects by the selected edit method from the edit method list by the second user operation.

2. The image processing apparatus according to claim 1, wherein the display unit comprises a liquid crystal display.

3. The image processing apparatus according to claim 1, wherein:

the user preference information designates at least one of a text area, an image area, and a ruled line area as a broader classification of objects; and the grouping unit groups, for each broader classification of objects designated in the user preference information, the objects belonging to the each broader classification.

4. The image processing apparatus according to claim 3, wherein:

the user preference information further comprises, as the sub-classification, with regard to the text area, at least one of setting information as to whether or not to classify objects depending on whether or not characters are handwritten, setting information as to whether or not to classify objects depending on a character type, setting information as to whether or not to classify objects depending on a character effect, and setting information as to whether or not to execute such classification as to extract a word to which a designated character is added; and the grouping unit executes, with regard to the text area, the sub-classification designated in the setting information within the user preference information.

5. The image processing apparatus according to claim 4, wherein:

the user preference information further comprises, as the sub-classification, with regard to the image area, at least one of setting information as to whether or not to classify objects depending on whether or not the image is a facial image and setting information as to whether or not to classify objects depending on whether or not the image has a specific shape; and the grouping unit executes, with regard to the image area, the sub-classification designated in the setting information within the user preference information.

6. The image processing apparatus according to claim 3, wherein:

the user preference information further comprises, as the sub-classification, with regard to the ruled line area, at least one of setting information as to whether or not to classify objects depending on a direction of a ruled line, setting information as to whether or not to classify objects depending on a line type of the ruled line, and setting information as to whether or not to classify objects depending on a thickness of the ruled line; and the grouping unit executes, with regard to the ruled line area, the sub-classification designated in the setting information within the user preference information.

7. The image processing apparatus according to claim 1, wherein the storage device comprises a nonvolatile storage device.

8. The image processing apparatus according to claim 7, wherein the nonvolatile storage device comprises a hard disk drive.

9. The image processing apparatus according to claim 1, wherein the image processing apparatus comprises a multi-function peripheral.

10. A computer-readable non-transitory recording medium having stored thereon an image processing program executed by a computer of an image processing apparatus, the image processing program comprising:

a first program code for causing the computer to register user preference information on a storage device based on a user operation, wherein the user preference information indicates how objects within an image are to be classified into groups;

a second program code for causing the computer to detect the objects within the image; and a third program code for causing the computer to read the user preference information from the storage device and classify the objects detected within the image into the groups indicated in the read user preference information;

a fourth program code for causing the computer to detect the user operation;

a fifth program code for causing the computer to edit, if (i) a first user operation for selecting a group designated in the user preference information, and (ii) a second user operation for selecting an edit method for the objects belonging to the selected group, are detected by the fourth program code, all the objects belonging to the selected group by the edit method selected by the second user operation; and a sixth program code for causing the computer to display the image at least one of before and after the edit performed by the fifth program code, wherein:

the user preference information includes a broader classification and a sub-classification belonging to the broader classification;

a broader classification ID identifies each broader classification;

a plurality of the sub-classification IDs identifies a plurality of types, respectively, belonging to the sub-classification;

the sixth program code causes the computer to display, on a user preference input screen, selectable options that include a first option for selecting all of broader classifications, a second option corresponding to each broader classification, and a third option corresponding to each sub-classification;
a first program code causes the computer to register the user preference information including all of the broader classifications if the first option is selected, register the user preference information including the broader classification corresponding to the selected second option if the second option is selected, and register the user preference information including a plurality of the sub-classification corresponding to the third option if the third option is selected;
the third program code causes the computer to associate the broader classification ID with the object for the broader classification and associate each sub-classification ID with the object for each of the types depending on the sub-classification;
the sixth program code causes the computer to display a classification list for designating one group of the broader classification and the sub-classification of what is to be edited and an edit method list for designating the edit method; and
the fifth program code causes the computer to identify all the objects associated with the classification ID, corresponding to either the broader classification ID or the sub-classification ID, of the selected group within the classification list by the first user operation and edit all the identified objects by the selected edit method from the edit method list by the second user operation.

11. The computer-readable non-transitory recording medium according to claim 10, wherein the storage device is a nonvolatile storage device.

12. The computer-readable non-transitory recording medium according to claim 11, wherein the nonvolatile storage device is a hard disk drive.

13. The computer-readable non-transitory recording medium according to claim 10, wherein the image processing apparatus comprises a multifunction peripheral.

14. An image processing method, comprising:
registering, via a grouping preference unit, user preference on a storage device based on a user operation, wherein the user preference information indicates how objects within an image are to be classified into groups;
detecting, via an image analysis unit, the objects within the image;
reading, via a grouping unit, the user preference information from the storage device and classifying the objects detected within the image into the groups indicated in the read user preference information;
associating, via the grouping unit, a broader classification ID with the object for the broader classification;
associating, via the grouping unit, each sub-classification ID with the object for each type depending on the sub-classification;
detecting, via an input unit, the user operation;
editing, via an image editing unit, if (i) a first user operation for selecting a group designated in the user preference information, and (ii) a second user operation for selecting an edit method for the objects belonging to the selected group, are detected by the input unit, all the objects belonging to the selected group by the edit method selected by the second user operation; and
displaying, via a display unit, the image at least one of before and after the edit performed by the image editing unit, wherein:
the user preference information includes the broader classification and the sub-classification belonging to the broader classification;
the broader classification ID identifies each broader classification; and
a plurality of the sub-classification IDs identifies a plurality of the types, respectively, belonging to the sub-classification;
the displaying includes the display unit displaying, on a user preference input screen, selectable options that include a first option for selecting all of broader classifications, a second option corresponding to each broader classification, and a third option corresponding to each sub-classification;
the registering includes that the grouping preference unit registers the user preference information including all of the broader classifications if the first option is selected, registers the user preference information including the broader classification corresponding to the selected second option if the second option is selected, and registers the user preference information including a plurality of the sub-classification corresponding to the third option if the third option is selected;
the displaying includes the display unit displaying a classification list for designating one group of the broader classification and the sub-classification of what is to be edited and an edit method list for designating the edit method; and
the editing includes the image editing unit identifying all the objects associated with the classification ID, corresponding to either the broader classification ID or the sub-classification ID, of the selected group within the classification list by the first user operation and editing all the identified objects by the selected edit method from the edit method list by the second user operation.

15. The image processing method according to claim 14, wherein the storage device is a nonvolatile storage device.

16. The image processing method according to claim 15, wherein the nonvolatile storage device is a hard disk drive.

17. The image processing apparatus according to claim 14, wherein the image processing apparatus comprises a multifunction peripheral.

* * * * *